(12) United States Patent
Spitschka

(10) Patent No.: US 10,715,370 B2
(45) Date of Patent: Jul. 14, 2020

(54) TEST DEVICE AND TEST METHOD FOR TESTING A COMMUNICATION

(71) Applicant: Rohde & Schwarz GmbH & Co. KG, Munich (DE)

(72) Inventor: Ralph Spitschka, Forstinning (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 14 days.

(21) Appl. No.: 16/122,521

(22) Filed: Sep. 5, 2018

(65) Prior Publication Data
US 2020/0076666 A1 Mar. 5, 2020

(51) Int. Cl.
*H04L 27/26* (2006.01)
*H04B 17/10* (2015.01)
*H04B 17/354* (2015.01)
*H04B 17/318* (2015.01)
*H04B 17/345* (2015.01)

(52) U.S. Cl.
CPC ....... *H04L 27/2659* (2013.01); *H04B 17/102* (2015.01); *H04B 17/318* (2015.01); *H04B 17/345* (2015.01); *H04B 17/354* (2015.01)

(58) Field of Classification Search
CPC . H04L 27/2659; H04B 17/102; H04B 17/318; H04B 17/345; H04B 17/354
USPC ...................................................... 370/252
See application file for complete search history.

(56) References Cited

U.S. PATENT DOCUMENTS

| | | | | |
|---|---|---|---|---|
| 2003/0083831 A1* | 5/2003 | Agrawal | ............. | G06F 7/50 |
| | | | | 702/65 |
| 2010/0110921 A1* | 5/2010 | Famolari | ............. | H04W 48/17 |
| | | | | 370/252 |
| 2010/0220618 A1* | 9/2010 | Kwon | ............. | H04W 72/1284 |
| | | | | 370/252 |
| 2013/0229931 A1* | 9/2013 | Kim | ............. | H04W 24/10 |
| | | | | 370/252 |
| 2014/0162628 A1* | 6/2014 | Bevelacqua | ......... | H04B 17/15 |
| | | | | 455/423 |
| 2015/0358839 A1* | 12/2015 | Olgaard | ............. | H04W 24/06 |
| | | | | 370/250 |
| 2016/0072530 A1* | 3/2016 | El-Hassan | ......... | H03F 1/0227 |
| | | | | 455/114.2 |
| 2016/0359718 A1* | 12/2016 | Banerjee | ............. | H04L 43/50 |
| 2017/0078030 A1* | 3/2017 | Olgaard | ............. | H04B 17/17 |

(Continued)

FOREIGN PATENT DOCUMENTS

WO 2017009209 A1 1/2017

OTHER PUBLICATIONS

Rohde & Schwarz, "IEEE 802.11ax Technology Introduction White Paper", Lisa Ward, Oct. 2016, IMA222_0e, 34 pages.

*Primary Examiner* — Phong La
(74) *Attorney, Agent, or Firm* — Ditthavong & Steiner, P.C.

(57) ABSTRACT

A test device for testing a communication between an access point and at least one station is provided. The test device comprises a communication recorder configured to record the communication between the access point and the at least one station, and a communication analyzer configured to analyze the recorded communication by looking for a burst of a specific type of one specific station of the at least one station. In this context, the communication analyzer is further configured to measure a deviation of an actual communication frequency of the burst of the specific type from a predefined communication frequency.

19 Claims, 4 Drawing Sheets

(56) References Cited

U.S. PATENT DOCUMENTS

2017/0078032 A1\* 3/2017 Olgaard ................ H04B 17/17
2017/0126450 A1   5/2017 Stott
2017/0339630 A1\* 11/2017 Ketonen .............. H04W 48/16
2019/0258805 A1\* 8/2019 Elovici ................ G06F 11/261

\* cited by examiner

TEST DEVICE AND TEST METHOD FOR TESTING A COMMUNICATION

TECHNICAL FIELD

The invention relates to a test device and a corresponding test method, especially for testing a communication between an access point and at least one station.

BACKGROUND ART

Generally, in times of an increasing number of applications providing wireless communication capabilities, there is a growing need of a test device and a corresponding test method especially for testing a communication between an access point and at least one station in order to verify correct functioning of said applications, thereby allowing for testing in an efficient and cost-effective manner.

US 2015/0358839 A1 discloses a method and a system for testing a radio frequency (RF) data packet signal transceiver device under test (DUT) by monitoring RF data packet signals between a tester and a DUT at a low network media layer, such as the physical layer in accordance with the Open Systems Interconnection reference model stack. By testing at a low layer, fewer signal conversions and data packet operations are required to perform various basic DUT tests, such as data packet throughput, DUT signal transmission performance, DUT packet type detection without packet decoding, validation of rate adaptation algorithms, and bit error rate testing. As it can be seen, due to the fact that the communication between the tester and the DUT is solely monitored, said test method and system do not allow for directly investigating the communication between an access point and a DUT or station, respectively, which disadvantageously leads to an inefficient and costly testing of such a communication between an access point and at least one station.

Accordingly, there is a need to provide a test device and a corresponding test method, especially for testing a communication between an access point and at least one station, each of which ensures both a high efficiency and reduced costs.

SUMMARY OF THE INVENTION

According to a first aspect of the invention, a test device for testing a communication between an access point and at least one station is provided. The test device comprises a communication recorder configured to record the communication between the access point and the at least one station, and a communication analyzer configured to analyze the recorded communication by looking for a burst of a specific type of one specific station of the at least one station. In this context, the communication analyzer is further configured to measure a deviation of an actual communication frequency of the burst of the specific type from a predefined communication frequency. Advantageously, in this manner, both a high efficiency and reduced costs can be ensured.

With respect to the at least one station, it is noted that said station may preferably be user equipment or a device under test. More preferably, said station may be user equipment providing wireless communication capabilities especially based on the wireless local area network (WLAN) standard or a device under test providing wireless communication capabilities especially based on the WLAN standard, respectively.

Furthermore, with respect to the communication recorder, it is noted that said communication recorder may especially be a sniffer.

In addition to this, as an alternative to looking for a burst of a specific type of one specific station of the at least one station, the communication analyzer may especially be configured to analyze the recorded communication by looking for a burst of a specific type of the at least one station or by looking for a burst of a specific type of any of the at least one station. In this context, it is noted that the burst of the specific type especially originates from the at least one station, preferably from any of the at least one station, more preferably from any specific station of the at least one station, most preferably from one specific station of the at least one station.

Moreover, alternatively to measuring a deviation of an actual communication frequency of the burst of the specific type from a predefined communication frequency, the communication analyzer may especially be configured to measure the burst of the specific type, preferably to measure a frequency error of the burst of the specific type.

According to a first preferred implementation form of the first aspect of the invention, the communication analyzer is further configured to measure the burst of the specific type with respect to at least one of power, timing, error vector magnitude, spectrum, spectrum flatness, IQ offset, unused tone error, or any combination thereof. Advantageously, for instance, flexibility, and thus efficiency, can further be increased.

According to a second preferred implementation form of the first aspect of the invention, the communication between the access point and the at least one station is based on the IEEE 802.11ax standard.

According to a further preferred implementation form of the first aspect of the invention, the burst of the specific type is a trigger response.

According to a further preferred implementation form of the first aspect of the invention, the communication analyzer is further configured to analyze a previous portion, especially prior to the burst of the specific type, of the recorded communication by looking for a burst of a further specific type of the access point. Advantageously, efficiency of testing the communication between the access point and the at least one station can further be increased.

With respect to the burst of the further specific type, it is noted that the burst of the further specific type may especially originate from the access point.

In addition to this, the communication analyzer may further be configured to measure the burst of the further specific type with respect to at least one of power, timing, error vector magnitude, spectrum, spectrum flatness, IQ offset, unused tone error, or any combination thereof.

According to a further preferred implementation form of the first aspect of the invention, the burst of the further specific type is a trigger frame.

According to a further preferred implementation form of the first aspect of the invention, the communication analyzer is further configured to measure a deviation of an actual communication frequency of the burst of the further specific type from a further predefined communication frequency. Additionally or alternatively, the communication analyzer is further configured to measure a frequency error between the burst of the specific type and the burst of the further specific type. Advantageously, for example, efficiency can be increased, thereby reducing costs.

According to a further preferred implementation form of the first aspect of the invention, the communication analyzer is further configured to determine if a frequency of the burst of the specific type correctly follows a frequency of the burst of the further specific type.

In addition to this or as an alternative thereto, the communication analyzer may especially be configured to measure several bursts of the further specific type and corresponding bursts of the specific type preferably with varying frequencies of the bursts of the further specific type.

According to a further preferred implementation form of the first aspect of the invention, the communication analyzer is further configured to determine if the frequency error between the burst of the specific type and the burst of the further specific type remains within a predefined limit. Advantageously, said predefined limit may especially be less than 10%, preferably less than 7%, more preferably less than 5%, most preferably less than 3%, of the respective complementary cumulative distribution function (CCDF) curve. Additionally or alternatively, with respect to the respective carrier frequency offset (CFO), said predefined limit may especially be less than 350 Hz, preferably less than 325 Hz, more preferably less than 300 Hz, most preferably less than 250 Hz.

According to a further preferred implementation form of the first aspect of the invention, the communication analyzer is further configured to determine a time duration of a short interframe space (SIFS) between the access point and the at least one station. Advantageously, said short interframe space may especially be within the range from −0.4 microseconds to 0.4 microseconds.

According to a second aspect of the invention, a test method for testing a communication between an access point and at least one station is provided. The test method comprises the steps of recording the communication between the access point and the at least one station, analyzing the recorded communication by looking for a burst of a specific type of one specific station of the at least one station, and measuring a deviation of an actual communication frequency of the burst of the specific type from a predefined communication frequency. Advantageously, in this manner, both a high efficiency and reduced costs can be ensured.

With respect to the at least one station, it is noted that said station may preferably be user equipment or a device under test. More preferably, said station may be user equipment providing wireless communication capabilities especially based on the wireless local area network (WLAN) standard or a device under test providing wireless communication capabilities especially based on the WLAN standard, respectively.

In addition to this, as an alternative to looking for a burst of a specific type of one specific station of the at least one station, the test method may especially comprise the step of analyzing the recorded communication by looking for a burst of a specific type of the at least one station or by looking for a burst of a specific type of any of the at least one station. In this context, it is noted that the burst of the specific type especially originates from the at least one station, preferably from any of the at least one station, more preferably from any specific station of the at least one station, most preferably from one specific station of the at least one station.

Moreover, alternatively to measuring a deviation of an actual communication frequency of the burst of the specific type from a predefined communication frequency, the test method may especially comprise the step of measuring the burst of the specific type, preferably to measure a frequency error of the burst of the specific type.

According to a first preferred implementation form of the second aspect of the invention, the test method further comprises the step of measuring the burst of the specific type with respect to at least one of power, timing, error vector magnitude, spectrum, spectrum flatness, IQ offset, unused tone error, or any combination thereof. Advantageously, for instance, flexibility, and thus efficiency, can further be increased.

According to a second preferred implementation form of the second aspect of the invention, the communication between the access point and the at least one station is based on the IEEE 802.11ax standard.

According to a further preferred implementation form of the second aspect of the invention, the burst of the specific type is a trigger response.

According to a further preferred implementation form of the second aspect of the invention, the test method further comprises the step of analyzing a previous portion, especially prior to the burst of the specific type, of the recorded communication by looking for a burst of a further specific type of the access point. Advantageously, efficiency of testing the communication between the access point and the at least one station can further be increased.

With respect to the burst of the further specific type, it is noted that the burst of the further specific type may especially originate from the access point.

In addition to this, the test method may further comprise the step of measuring the burst of the further specific type with respect to at least one of power, timing, error vector magnitude, spectrum, spectrum flatness, IQ offset, unused tone error, or any combination thereof.

According to a further preferred implementation form of the second aspect of the invention, the burst of the further specific type is a trigger frame.

According to a further preferred implementation form of the second aspect of the invention, the test method further comprises the step of measuring a deviation of an actual communication frequency of the burst of the further specific type from a further predefined communication frequency. In addition to this or as an alternative, the test method further comprises the step of measuring a frequency error between the burst of the specific type and the burst of the further specific type. Advantageously, for example, efficiency can be increased, thereby reducing costs.

According to a further preferred implementation form of the second aspect of the invention, the test method further comprises the step of determining if a frequency of the burst of the specific type correctly follows a frequency of the burst of the further specific type.

In addition to this or as an alternative thereto, the test method may especially comprise the step of measuring several bursts of the further specific type and corresponding bursts of the specific type preferably with varying frequencies of the bursts of the further specific type.

According to a further preferred implementation form of the second aspect of the invention, the test method further comprises the step of determining if the frequency error between the burst of the specific type and the burst of the further specific type remains within a predefined limit. Advantageously, said predefined limit may especially be less than 10%, preferably less than 7%, more preferably less than 5%, most preferably less than 3%, of the respective complementary cumulative distribution function (CCDF) curve. Additionally or alternatively, with respect to the respective carrier frequency offset (CFO), said predefined limit may especially be less than 350 Hz, preferably less than 325 Hz, more preferably less than 300 Hz, most preferably less than 250 Hz.

According to a further preferred implementation form of the second aspect of the invention, the test method further comprises the step of determining a time duration of a short interframe space (SIFS) between the access point and the at least one station. Advantageously, said short interframe space may especially be within the range from −0.4 microseconds to 0.4 microseconds.

BRIEF DESCRIPTION OF THE DRAWINGS

Exemplary embodiments of the invention are now further explained with respect to the drawings by way of example only, and not for limitation. In the drawings.

DETAILED DESCRIPTION OF THE PREFERRED EMBODIMENTS

Figure 1:
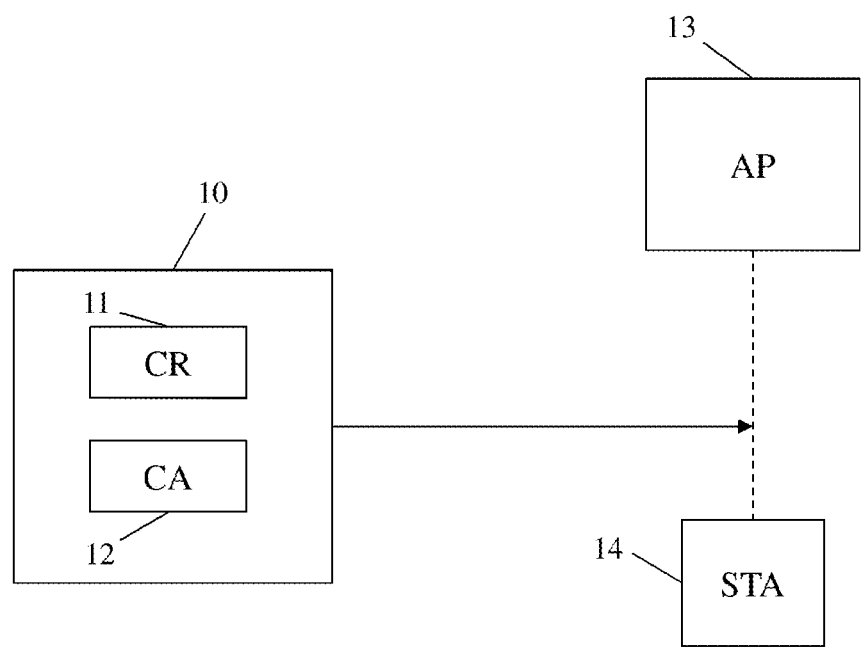
FIG. 1 shows an exemplary embodiment of a test device according to the first aspect of the invention.

Firstly, FIG. 1 illustrates an exemplary embodiment of the inventive test device 10 for testing a communication between an access point 13 and at least one station, exemplarily the station 14. The test device 10 comprises a communication recorder 11 and a communication analyzer 12.

In this context, the communication recorder 11 records the communication between the access point 13 and the at least one station or the station 14, respectively. Additionally, the communication analyzer 12 analyzes the recorded communication by looking for a burst of a specific type of the station 14. In further addition to this, the communication analyzer 12 measures a deviation of an actual communication frequency of the burst of the specific type from a predefined communication frequency.

In this context, it is noted that in the case of at least two stations, the communication analyzer 12 analyzes the recorded communication by looking for a burst of a specific type of one specific station of the at least two stations.

Moreover, it might be particularly advantageous if the communication analyzer 12 additionally measures the burst of the specific type with respect to at least one of power, timing, error vector magnitude, spectrum, spectrum flatness, IQ offset, unused tone error, or any combination thereof.

It is noted that the communication between the access point 13 and the at least one station or the station 14, respectively, may especially be based on the IEEE 802.11ax standard.

In this context, it might be particularly advantageous if the burst of the specific type is a trigger response.

Further advantageously, the communication analyzer 12 may additionally analyze a previous portion, especially prior to the burst of the specific type, of the recorded communication by looking for a burst of a further specific type of the access point 13.

In this context, the burst of the further specific type may advantageously be a trigger frame.

It is further noted that it might be particularly advantageous if the communication analyzer 12 further measures a deviation of an actual communication frequency of the burst of the further specific type from a further predefined communication frequency.

In addition to this or as an alternative, the communication analyzer 12 may advantageously measure a frequency error between the burst of the specific type and the burst of the further specific type.

Furthermore, the communication analyzer 12 may additionally determine if a frequency of the burst of the specific type correctly follows a frequency of the burst of the further specific type.

It might be particularly advantageous if the communication analyzer 12 further determines if the frequency error between the burst of the specific type and the burst of the further specific type remains within a predefined limit.

Moreover, the communication analyzer 12 may further determine a time duration of a short interframe space between the access point 13 and the at least one station or the station 14, respectively.

With general respect to the access point 13, it should be noted that said access point 13 could be replaced by a signaling unit, especially by a signaler, which sets up a communication with the at least one station or the station 14, respectively.

Figure 2:
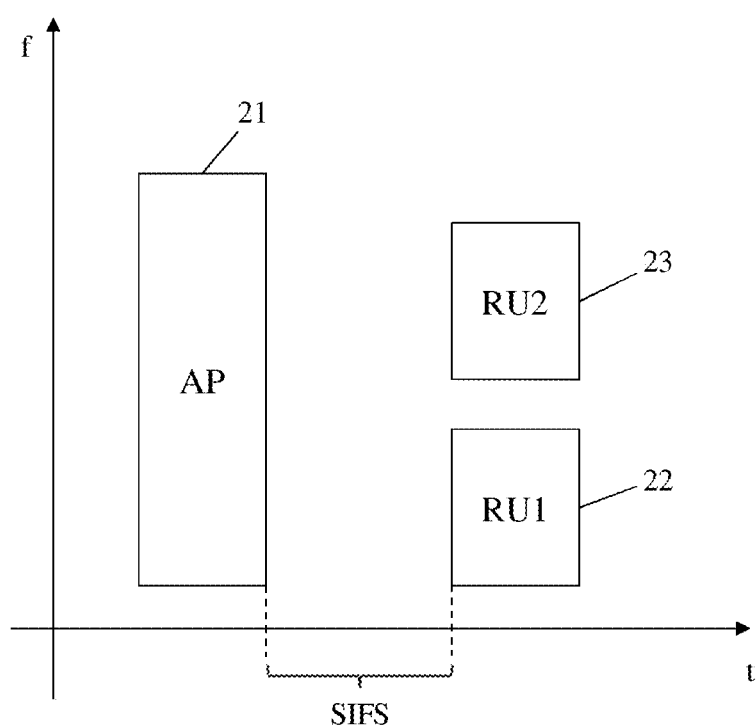
FIG. 2 shows an exemplary communication between an access point and two stations with special respect to frequency and time.

Now, with respect to FIG. 2, an exemplary communication between an access point (AP) and two stations, which are exemplarily represented by two resource units (RU1, RU2), is depicted with special respect to frequency f and time t.

As it can be seen, whereas the access point uses the whole frequency band, the stations or resource units, respectively, share the respective frequency band especially in an orthogonal frequency-division multiple access (OFDMA) manner.

Furthermore, in accordance with FIG. 2, each of the two stations replies to a request of the access point 21, especially a trigger frame, at the same time. Preferably, said replies are performed after the short interframe space (SIFS) time.

As a consequence of this, each of the stations sends its reply, especially a trigger response, to the access point indeed at the same time, but on its corresponding allocated resource unit. In this context, the different resource units 22, 23 cause corresponding different requirements with special respect to accuracy of at least one of time, frequency, level, power, or any combination thereof.

In addition to this, it is noted that each of the inventive test device and the corresponding test method advantageously allows for measuring each of the trigger responses of the stations with respect to the preceding trigger frame of the access point especially in a relative manner.

Figure 3:
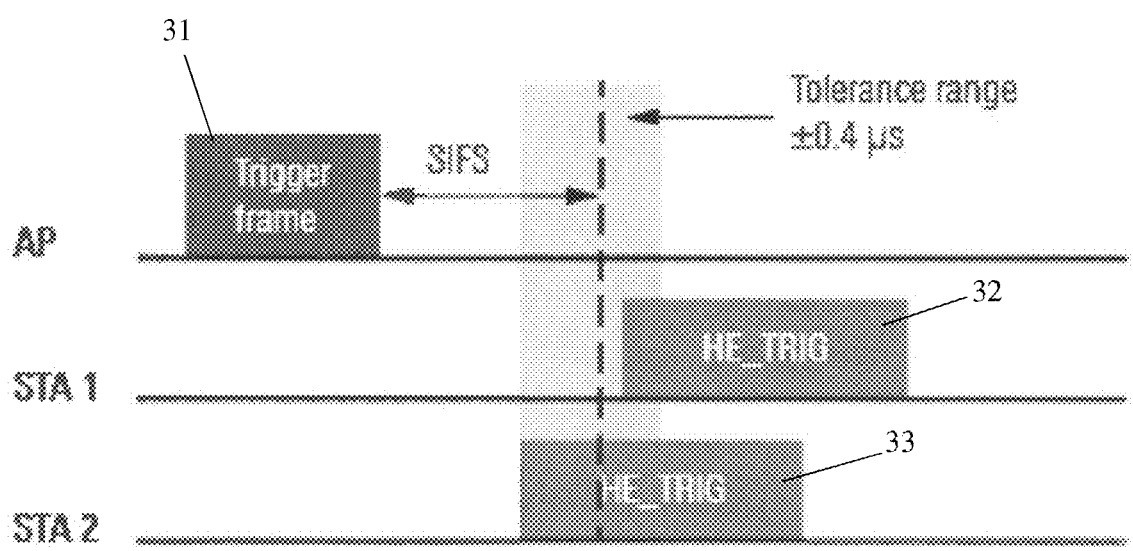
FIG. 3 shows an exemplary communication with special respect to timing accuracy.

Moreover, FIG. 3 illustrates a further exemplary communication between an access point and two stations with special respect to timing accuracy.

As it can be seen from FIG. 3, after a trigger frame 31 has been sent by the access point (AP), each of the first station (STA 1) and the second station (STA 2) replies within the SIFS time with the aid of the corresponding trigger response, which is exemplarily called "HE TRIG" 32, 33.

Furthermore, FIG. 3 additionally depicts a tolerance range with respect to the SIFS time. Said tolerance range is between −0.4 microseconds and 0.4 microseconds.

Figure 4:
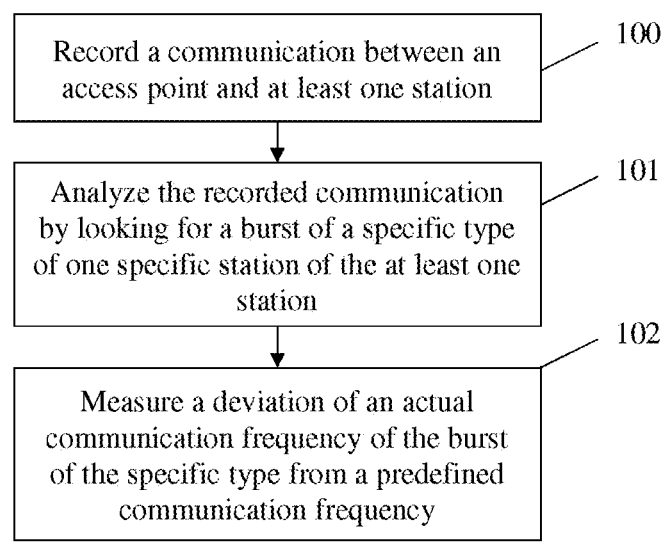
FIG. 4 shows a flow chart of an exemplary embodiment of the second aspect of the invention.

Finally, FIG. 4 shows a flow chart of an exemplary embodiment of the inventive test method. In a first step 100, a communication between an access point and at least one station is recorded. Then, in a second step 101, the recorded communication is analyzed by looking for a burst of a specific type of one specific station of the at least one station. In addition to this, in a third step 102, a deviation of an actual communication frequency of the burst of the specific type from a predefined communication frequency is measured.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A test device for testing a communication between an access point and at least one station, the test device comprising:
   a communication recorder configured to record the communication between the access point and the at least one station, and
   a communication analyzer configured to analyze the recorded communication by looking for a burst of a specific type of one specific station of the at least one station,
   wherein the communication analyzer is further configured to measure a deviation of an actual communication frequency of the burst of the specific type from a predefined communication frequency,
   wherein the communication analyzer is further configured to measure a frequency error between the burst of the specific type and the burst of the further specific type, and
   wherein the communication analyzer is further configured to determine if the frequency error between the burst of the specific type and the burst of the further specific type remains within a predefined limit.

2. The test device according to claim 1,
   wherein the communication analyzer is further configured to measure the burst of the specific type with respect to at least one of power, timing, error vector magnitude, spectrum, spectrum flatness, IQ offset, unused tone error, or any combination thereof.

3. The test device according to claim 1,
   wherein the communication between the access point and the at least one station is based on the IEEE 802.11ax standard.

4. The test device according to claim 1,
   wherein the burst of the specific type is a trigger response.

5. The test device according to claim 1,
   wherein the communication analyzer is further configured to analyze a previous portion, especially prior to the burst of the specific type, of the recorded communication by looking for a burst of a further specific type of the access point.

6. The test device according to claim 5,
   wherein the burst of the further specific type is a trigger frame.

7. The test device according to claim 5,
   wherein the communication analyzer is further configured to measure a deviation of an actual communication frequency of the burst of the further specific type from a further predefined communication frequency.

8. The test device according to claim 5,
   wherein the communication analyzer is further configured to determine if a frequency of the burst of the specific type correctly follows a frequency of the burst of the further specific type.

9. The test device according to claim 1,
   wherein the communication analyzer is further configured to determine a time duration of a short interframe space between the access point and the at least one station.

10. A test method for testing a communication between an access point and at least one station, the test method comprising the steps of:
    recording the communication between the access point and the at least one station,
    analyzing the recorded communication by looking for a burst of a specific type of one specific station of the at least one station,
    measuring a deviation of an actual communication frequency of the burst of the specific type from a predefined communication frequency,
    measuring a frequency error between the burst of the specific type and the burst of the further specific type, and
    determining a time duration of a short interframe space between the access point and the at least one station.

11. The test method according to claim 10,
    wherein the test method further comprises the step of measuring the burst of the specific type with respect to at least one of power, timing, error vector magnitude, spectrum, spectrum flatness, IQ offset, unused tone error, or any combination thereof.

12. The test method according to claim 10,
    wherein the communication between the access point and the at least one station is based on the IEEE 802.11ax standard.

13. The test method according to claim 10,
    wherein the burst of the specific type is a trigger response.

14. The test method according to claim 10,
    wherein the test method further comprises the step of analyzing a previous portion, especially prior to the burst of the specific type, of the recorded communication by looking for a burst of a further specific type of the access point.

15. The test method according to claim 14,
    wherein the burst of the further specific type is a trigger frame.

16. The test method according to claim 14,
    wherein the test method further comprises the step of measuring a deviation of an actual communication frequency of the burst of the further specific type from a predefined communication frequency.

17. The test method according to claim 16,
    wherein the test method further comprises the step of determining if the frequency error between the burst of the specific type and the burst of the further specific type remains within a predefined limit.

18. The test method according to claim 10,
    wherein the test method further comprises the step of determining a time duration of a short interframe space between the access point and the at least one station.

19. The test method according to claim 14, wherein the test method further comprises the step of determining if a frequency of the burst of the specific type correctly follows a frequency of the burst of the further specific type.

* * * * *